Aug. 25, 1964    G. H. RAWCLIFFE    3,146,389
ROTARY ELECTRIC MACHINES

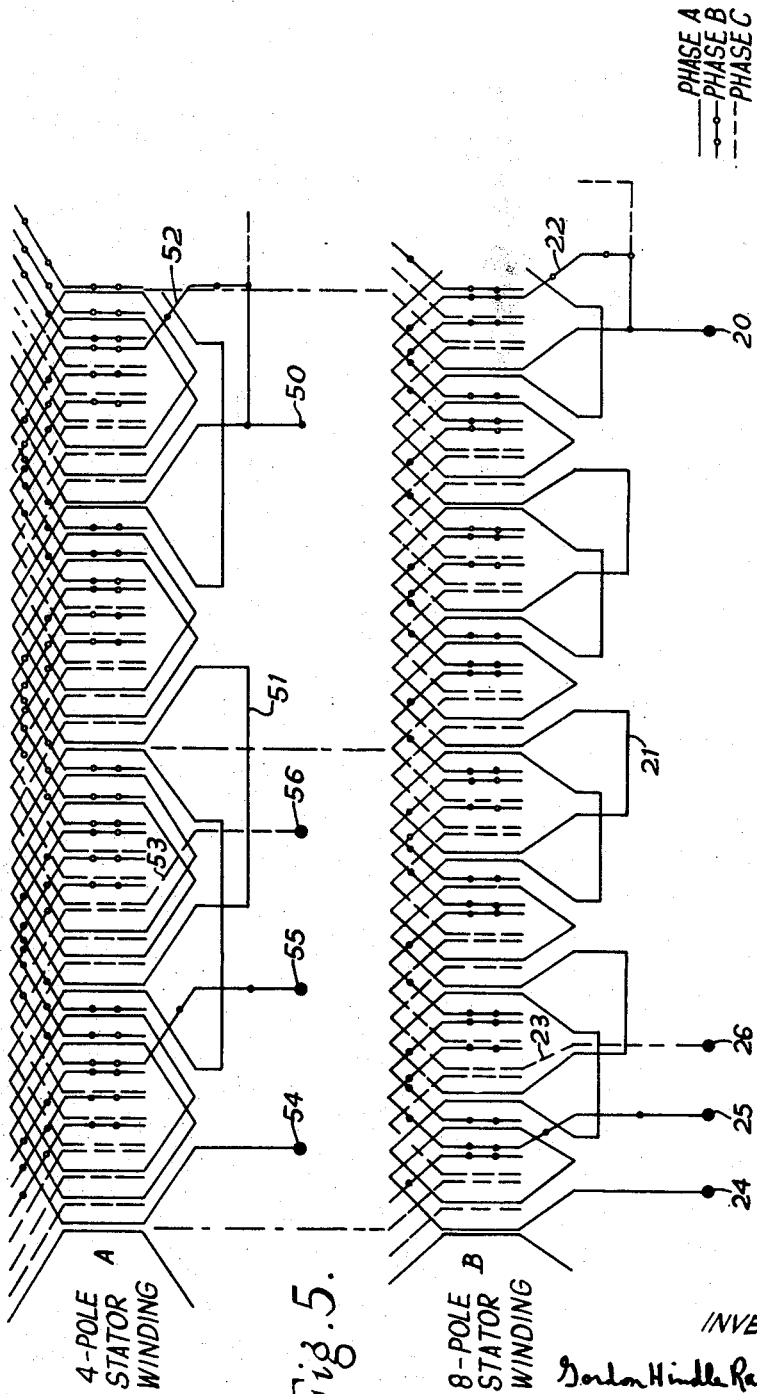

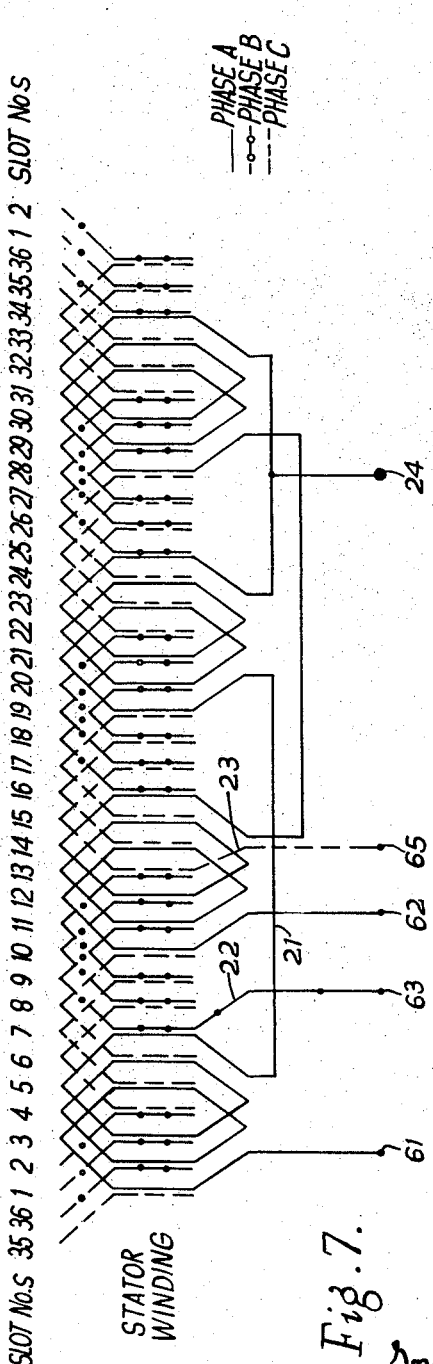

Filed Jan. 9, 1961    6 Sheets-Sheet 5

INVENTOR
Gordon Hindle Rawcliffe
BY
Stevens, Davis, Miller & Mosher
ATTORNEYS

Aug. 25, 1964  G. H. RAWCLIFFE  3,146,389
ROTARY ELECTRIC MACHINES

Filed Jan. 9, 1961  6 Sheets-Sheet 6

INVENTOR
Gordon Houndle Rawcliffe
BY
Stevens, Davis, Miller & Mosher
ATTORNEYS

United States Patent Office 3,146,389
Patented Aug. 25, 1964

3,146,389
ROTARY ELECTRIC MACHINES
Gordon Hindle Rawcliffe, Clifton, Bristol, England, assignor to National Research Development Corporation, London, England
Filed Jan. 9, 1961, Ser. No. 81,546
Claims priority, application Great Britain Jan. 14, 1960
6 Claims. (Cl. 318—187)

This invention relates to rotary electric machines, particularly to synchronous motors and synchronous generators.

It is a characteristic feature of the A.C. synchronous motor of conventional design that it has no inherent self-starting properties if the windings of the stationary machine are energised. Moreover, when the machine is running, if a pulsating load is applied to the rotor, the rotor tends to "hunt." That is, the actual rotational position of the rotor oscillates about the moving mean rotational position.

In normal synchronous machines, it is therefore customary to provide a closed-circuit starting and damping winding, fixed to the D.C. field poles. This closed-circuit winding causes a starting torque to be obtained by reaction with the main field set up by the A.C. energised armature. It also provides damping if there are pulsations in the load. When the machine is running normally at full-speed and with steady load, there is no relative movement between the armature magnetic field and this damping winding.

It is a characteristic feature of the A.C. induction motor that both the stator and the wound rotor of a slip-ring induction motor can be electrically energised simultaneously, with such relative connections that the speeds of the rotating fields are additive. Subject to the limitations mentioned below, the motor will then run at double its normal synchronous speed. That is, it will run at a speed of $(4f/p)$ r.p.s., where $f$ is the supply frequency and $p$ is the number of main poles in the motor. Although such a machine is constructionally of the form used as an induction motor, it functions as a synchronous motor when doubly-fed in the manner described.

The limitations of such a double-fed machine are that, like any synchronous machine, it has no inherent starting or damping properties. This fact has been the principal objection to its use hitherto. Various double-fed machines have been proposed, from time to time, which were intended to overcome these two defects, but none has hitherto been wholly satisfactory.

For one reason, it is impossible to fit a closed-circuit damping winding, of the normal type, to either the stator or the rotor of the machine, because both windings are A.C. energised and such a damping winding acts as a short-circuited winding with respect to the stator or the rotor on which it is fixed.

The object of the present invention is to provide such a double-speed synchronous machine, either motor or generator, of improved form, having means for starting the machine electrically, when it is operated as a motor, and having electrical means for damping torque fluctuations, such as to make the machine acceptable for normal use.

The present invention provides a rotary electric machine having stator and rotor windings, the stator winding being constructed to provide a main field of $p$ poles when energised at a frequency $f$ per second and to further provide a superimposed rotating field of $np$ poles when further energised at a frequency $2nf$, where $n$ is a small integer, and the rotor winding having the coils thereof connected to act as an open-circuited winding in relation to the main field of $p$ poles and as a short-circuited winding in relation to the superimposed field of $np$ poles.

The main field of $p$ poles and the superimposed field of $np$ poles, provided by the stator winding, may be developed by two separate stator winding parts, superimposed in the same slots of the stator, the first part being wound to provide the main field of $p$ poles and being energised at frequency $f$ and the second part being wound to provide $np$ poles, the coils thereof each extending $1/n$ times the number of slots of the coils for the field of $p$ poles, and being energised at frequency $2nf$.

The preferred arrangement provides a stator winding having two separate sets of phase windings, the one energised with A.C. of frequency $f$ to provide the main field of $p$ poles and the other energised wtih A.C. of frequency $6f$ to provide a superimposed field of $3p$ poles. This arrangement is particularly attractive for a 3-phase machine, as will be explained more fully later herein. Such an arrangement having a superimposed field of $3p$ poles, provides third harmonic damping of rotor torque fluctuations.

Alternatively, a machine may be wound having a superimposed field to provide harmonic damping of a higher order than third harmonic, but such higher harmonic damping would appear to have less practical merit than the lower harmonic damping, that is second harmonic or third harmonic damping.

In one arrangement, using second harmonic damping, a single set of phase-windings may be used, the coils of each phase-winding being series-connected and provided with a centre tap. Each phase-winding is then fed with A.C. of frequency $f$ between its outer ends and with A.C. of frequency $4f$ between its centre tape and the outer ends, the two halves of the phase-winding being then fed in parallel.

For all embodiments of the invention and whether the stator is provided with two sets of phase windings separately energised at two different frequencies or whether the stator is provided with a single set of phase-windings simultaneously energised at the two frequencies, the corresponding rotor phase windings have the coils so connected that the windings appear as open-circuited windings in relation to the main field and as short-circuited windings in relation to the superimposed field of higher pole number, in order to provide for a circulating damping current at a harmonic frequency.

The terms "open-circuited" and "short-circuited" are used herein in the sense relating to the impedance of the winding to current induced therein by the main magnetic field and the superimposed magnetic field respectively. In relation to the external circuit, the rotor windings are, of course, not open-circuited since they are fed with current from a supply main, when the machine is operated as a motor, and feed current into a load, when the machine is operated as a generator.

The practical connection of the rotor phase windings depends upon the machine type, the number of poles of the main field and the order of the harmonic damping used.

While appropriate connection of the rotor phase windings is necessary for carrying into effect the present invention, in its various embodiments, the desired effect of such rotor windings when appropriately connected is already known, as such. It is therefore sufficient herein to illustrate by example rotor windings which fulfill the requirements already stated.

One example for a 3-phase machine having a 2-pole main field and third harmonic damping provided by a 6-pole superimposed field has an open delta 3-phase, 2-pole full-pitch winding which serves as a series-connected single-phase 6-pole winding between the points provided by the open-delta connection.

Another example for a 3-phase machine having a 4-pole main field and second harmonic damping provided by an 8-pole superimposed field has each phase winding of the rotor winding connected as a series-parallel arrangement in which alternate coils or coil groups of each phase-winding are connected in series to form the two parallel branches of the rotor winding. For a field of 4 poles, the E.M.F.'s developed in the coils of each branch are equal and in-phase, so that no circulating current flows in the conductors connecting the two branches in parallel and the winding appears as an open-circuited winding. For a field of 8 poles, however, the E.M.F.'s developed by all the coils of one branch are in-phase with each other but opposite in phase to the E.M.F.'s developed by all the coils of the other branch. For the field of 8 poles, therefore, the series-parallel combination acts as a series circuit carrying a large circulating current and appears as a short-circuit winding.

To start a machine according to this invention, to operate as a motor, the stator winding is energised solely with the auxiliary A.C. supply of the higher frequency employed. The resultant rotating field, of the multiple pole number, reacts with the rotor winding which appears as a short-circuit winding. The motor starts up, due to the induced rotor circulating currents in the same manner as an induction motor and runs up to speed, attaining a running speed corresponding to the frequency of the auxiliary A.C. supply divided by the "superimposed" field pole number, this being the only pole-number present during the starting-up conditions.

The main supply of frequency $f$ is then connected to both the stator winding and the rotor winding simultaneously. The motor then operates as a synchronous motor, pulling into step and running at twice the synchronous speed, that is $4f/p$ r.p.s., where $p$ is the main field pole number.

The higher frequency voltage applied to the stator winding is then reduced to a low value. Under running conditions, the short-circuit effect of the rotor winding in relation to the field of multiple pole numbers provides damping properties to prevent hunting of the rotor.

The superimposed rotating field of multiple pole numbers keeps step with the full mechanical rotational speed of the rotor. When the rotor is running at full speed, there is not relative rotation between the superimposed rotating field and the rotor winding. Any pulsations in the mechanical load and the rotor rotational velocity cause damping currents to flow around the rotor phase-windings, but no extra voltage to appear between the ends of the phase-windings.

The doubly-fed synchronous machine of the present invention is completely reversible in relation to power flow at the lower frequency concerned and can operate either as a motor or as a generator.

In order that the invention may be readily carried into effect, three embodiments, all synchronous motor/generators for operation with a three-phase A.C. supply of 50 cycles per second, will now be described in detail, by way of example, with reference to the accompanying drawings, in which:

FIG. 5 is a slot winding diagram of the stator windings of FIG. 4;

FIG. 7 is a slot winding diagram of the stator winding of FIG. 6;

Figure 1:
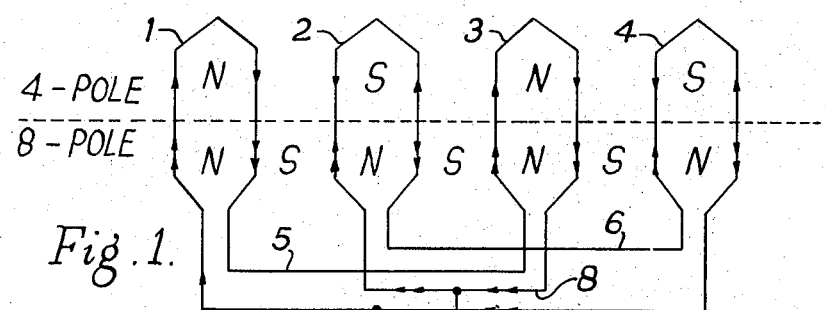
FIG. 1 is a coil-group layout diagram of the rotor winding for a machine having a 4-pole main field and an 8-pole superimposed damping field.

In FIG. 1, the rotor winding comprises four coil-groups 1, 2, 3 and 4 comprising coils of full pitch to 8-poles. The same coil-groups are indicated by the same reference numerals in FIG. 2 and the circuit connections may be seen from either figure. Coil-groups 1 and 3 are series-connected by conductor 5; coil-groups 4 and 2 are series-connected by conductor 6; the two series-connected branches are connected in parallel by conductors 7 and 8.

Figure 2:
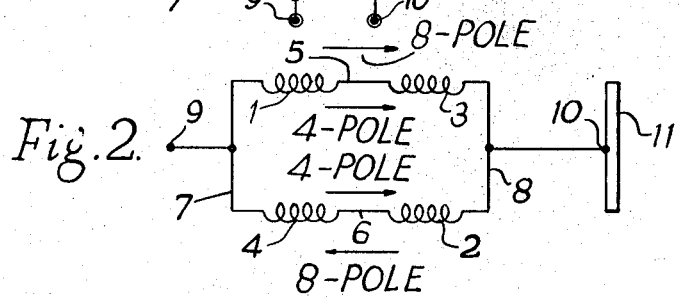
FIG. 2 is a coil-group circuit diagram and E.M.F. diagram corresponding to the layout of FIG. 1.

FIGS. 1 and 2 show one phase-winding of a three-phase machine, the three phase-windings being connected in star. Conductor 7 is connected to the star point 9 and conductor 8 is connected in terminal 10 and one slip-ring 11 of three rotor slip-rings.

In FIG. 1 the E.M.F. distribution is shown above the dash-line for the 4-pole condition and below the dash-line for the 8-pole condition.

In FIG. 2, the E.M.F. direction is shown by the arrows inside the coil-group loop for the 4-pole condition and outside for the 8-pole condition. It will be noted that the 4-pole E.M.F.'s are in-phase between the terminals 9 and 10 and the 8-pole E.M.F.'s are in-phase around the coil-group loops 1, 3, 2, 4.

Figure 3:
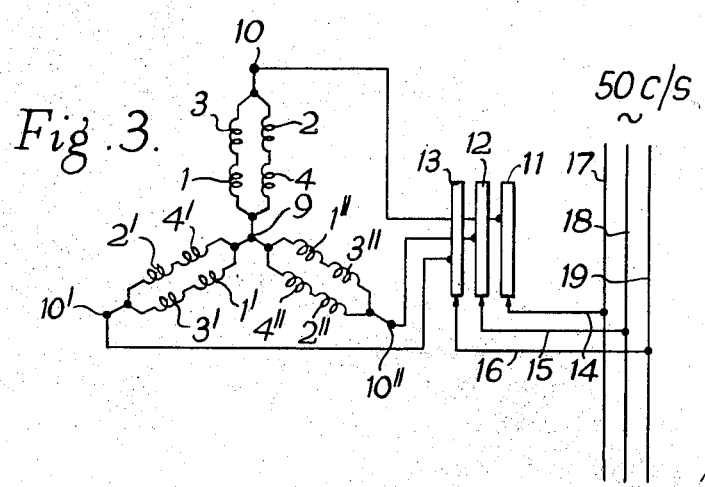
FIG. 3 is a rotor phase winding circuit diagram, the phase windings comprising three coil groups according to FIGS. 1 and 2, in star connection.

In FIG. 3, the rotor winding comprises three identical sets of coils, all corresponding to those shown in FIG. 2. The three sets are indicated by similar reference numerals, the three phase-windings being distinguished by single dash and double dash references. The first phase has terminal 10 connected to slip ring 11, as in FIG. 2. The other two phases have terminals 10′ and 10″ respectively connected to slip-rings 12 and 13. The three slip-rings 11, 12 and 13 are respectively connected by brush leads 14, 15 and 16, to 50 c.p.s. A.C. supply conductors 17, 18 and 19 respectively.

Figure 4:
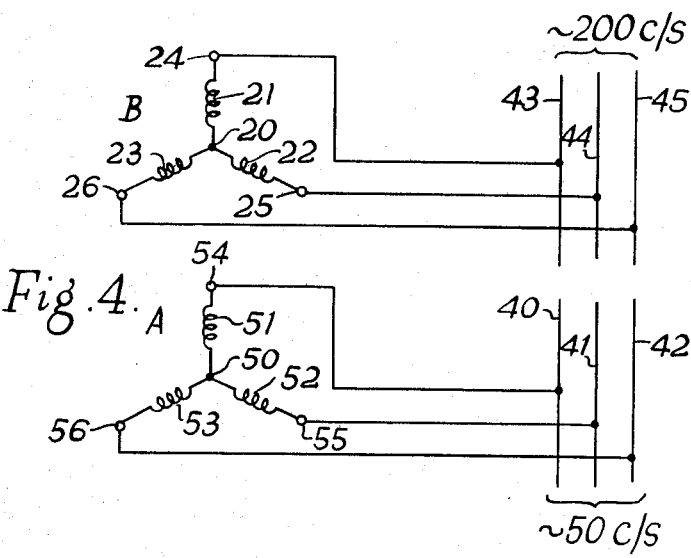
FIG. 4 is a circuit diagram of one form of stator windings comprising separate sets of phase windings providing respectively a 4-pole field and an 8-pole field.

The stator windings of FIG. 4 comprise two separate sets of phase windings, both star-connected, wound into the stator slots of the machine. The stator windings of FIG. 4 provide a main field of 4-poles and a superimposed damping field and auxiliary starting field of 8-poles, for which the rotor winding of FIGS. 1, 2 and 3 is arranged.

In FIG. 4, the main 4-pole field winding "A" comprises three phase windings 51, 52 and 53 connected between the star point 50 and terminals 54, 55 and 56 respectively. The terminals 54, 55 and 56 are respectively connected to the conductors 40, 41 and 42 of a 3-phase 50 c.p.s. A.C. supply.

The 8-pole field winding "B" comprises three phase windings 21, 22 and 23 connected between the star point 20 and terminals 24, 25 and 26 respectively. The terminals 24, 25 and 26 are respectievly connected to the conductors 43, 44 and 45 of an auxiliary 3-phase 200 c.p.s. A.C. supply.

FIG. 5 is the slot winding diagram of the stator winding of FIG. 4, the windings and terminals being indicated by the same reference numerals in both figures.

The phase windings "A" providing the main 4-pole field are shown at the top of the diagram. In these windings, the coil pitch is from slot 1 to slot 8 and so on, that is a pitch of 7 slots which is ⅞ of full pole pitch.

The phase windings "B" providing the superimposed and starting 8-pole field are shown at the bottom of the diagram. In these windings, the coil pitch is from slot 1 to slot 5 and so on, that is a pitch of 4 slots, that is 5/9 of full (8-pole) pole pitch.

Figure 6:
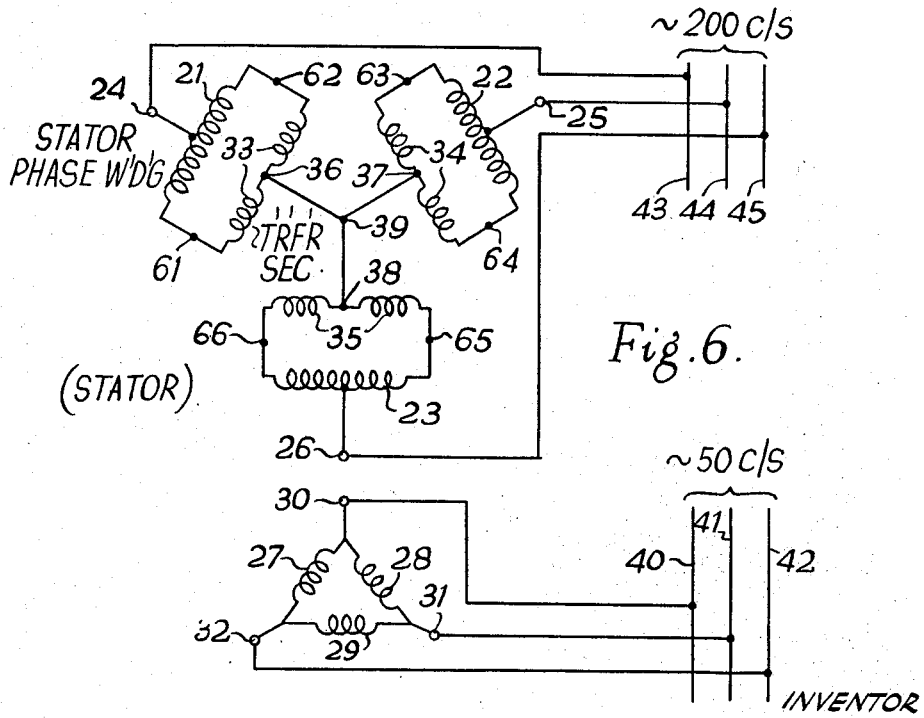
FIG. 6 is a circuit diagram of another form of stator winding comprising a single set of phase windings energised at two frequencies to provide 4-pole and 8-pole fields.

FIG. 6 shows an alternative stator winding arrangement in which both the 4-pole and 8-pole fields are provided by a single winding which is simultaneously energised at two frequencies, for running conditions.

The stator windings of FIG. 6 comprise three centre tapped phase-windings 21, 22 and 23 having respectively centre-tap terminals 24, 25 and 26. A 3-phase, 50 c.p.s. A.C. energising transformer has three primary windings 27, 28 and 29, in this example delta-connected between terminals 30, 31 and 32. The transformer has three centre-tapped secondary windings 33, 34 and 35 having, respectively, the centre-tap terminals 36, 37 and 38 connected to a star-point 39.

The ends of phase-windings 21, 22 and 23, respectively, are connected between terminal pairs 61, 62; 63, 64 and 65, 66 respectively, across the transformer secondary windings 36, 37 and 38. The primary terminals 30, 31 and 32 are connected to a 3-phase, 50 c.p.s. A.C. supply on lines 40, 41 and 42 respectively. The phase-winding centre tap terminals 24, 25 and 26 respectively are connected to a 3-phase, 200 c.p.s. A.C. supply on lines 43, 44 and 45 respectively.

With respect to the 50 c.p.s. supply on lines 40, 41 and 42, the three stator phase-windings (21, 22 and 23 are effectively series-connected. With respect to the 200 c.p.s. A.C. supply on lines 43, 44 and 45, the stator phase-windings, are effectively parallel-connected.

FIG. 7 is the slot winding diagram of the stator winding of FIG. 6, the windings and terminals being indicated by the same reference numerals in both figures.

The stator winding has a coil pitch from slot 1 to slot 5 and so on, that is a pitch of 4 slots corresponding to 4/6 full (4-pole) pole pitch and 5/9 full (8-pole) pole pitch.

For starting a machine having the rotor windings of FIGS. 1 to 3 and the stator windings of FIGS. 4 and 5, the rotor winding is not energised and the 50 c.p.s. A.C. supply is isolated from terminals 54, 55 and 56. The 200 c.p.s. A.C. supply is connected to phase-winding "B" at terminals 24, 25 and 26. The phase-windings 24, 25 and 26 energised at 200 c.p.s., develop an 8-pole field rotating about the stator axis at twice the 50 c.p.s. synchronous speed.

The rotor-winding of FIGS. 1 to 3 behaves as a short-circuit winding; the motor is thus self-starting in the manner of an induction motor and runs up to nearly double, 50 c.p.s., synchronous speed.

Upon this speed being reached, the rotor windings and stator windings "A" are simultaneously energised at 50 c.p.s. The terminals 54, 55 and 56 of stator winding "A" are supplied from lines 40, 41 and 42. The rotor slip-ring 11, of FIG. 3 is connected to line 17 and the slip-rings 12 and 13 of the other two phases are respectively connected to lines 18 and 19. The lines 40, 41 and 42 may be regarded as connected to the lines 17, 18 and 19 in the sense to provide oppositely-rotating rotor and stator fields.

The rotor speed pulls into step with the two oppositely rotating 4-pole 50 c.p.s. magnetic fields at twice synchronous frequency, in this example 3,000 r.p.m. The A.C. supply at 200 c.p.s. on lines 43, 44 and 45 is then reduced to a low value, the motor being energised, as far as the external mechanical load on the rotor shaft is concerned, from the 50 c.p.s. A.C. supply on lines 17, 18 and 19 and on lines 40, 41 and 42.

The purpose of the residual A.C. supply at 200 c.p.s. is solely to energise the stator 8-pole rotating field, in order to obtain the damping effect of the rotor winding. When the motor is running at full speed, that is at 3,000 r.p.m., there is no relative rotating between the stator 8-pole field and the rotor winding. Any pulsations in the rotor load, causing the rotor speed to lag relatively to the 8-pole field, give rise to circulating currents around the three rotor phase-winding circuits and hence provide the required damping effect.

For starting a machine having the rotor windings of FIGS. 1 to 3 and the stator windings of FIGS. 6 and 7, the rotor winding is not energised and the 50 c.p.s., A.C. supply is isolated from transformer terminals 30, 31 and 32. The 200 c.p.s. A.C. supply is connected to phase-winding terminals 24, 25 and 26. The phase-windings 21, 22 and 23, thus energised, develop an 8-pole field rotating about the stator axis at twice the 50 c.p.s. synchronous speed.

The motor starts and runs up to speed in the manner of an induction motor, as previously described.

Upon the double, 50 c.p.s., synchronous speed being reached, the rotor and stator windings are simultaneously energised at 50 c.p.s. The rotor slip-rings 11, 12 and 13 are supplied from lines 17, 18 and 19 respectively. Transformer terminals 30, 31 and 32 are supplied from lines 40, 41 and 42, which are correctly connected to lines 17, 18 and 19 to provide oppositely-rotating rotor and stator fields.

When the rotor speed pulls into step, the A.C. supply at 200 c.p.s. on lines 43, 44 and 45 is reduced to the low value required to maintain the superimposed 8-pole damping field.

By choosing a suitable ratio for the transformer feeding the stator winding, the flux density provided by the stator winding for both the 4-pole field and the 8-pole field can be separately adjusted to suitable values.

Conveniently, an auxiliary 50 c.p.s. to 200 c.p.s. A.C. frequency-converter is used for the supply on lines 43, 44 and 45. The power demand from the frequency-converter is low when the motor is running at full speed and is of short duration when the motor is being started. A low power rating converter is thus sufficient. A single converter may supply several similar motors, provided that they are started up only one at a time. In such a case, the 200 c.p.s. A.C. supply to each motor can be separately adjusted, as for example, by means of intermediate auto-transformers.

The machines described with reference to FIGS. 1 to 3 and FIGS. 4 and 5 or FIGS. 6 and 7 are reversible with respect to the supply of power and may be used alternatively as synchronous motors or as synchronous generators. In the latter use, the power supply at 200 c.p.s. for starting electrically is not required, since the rotor is started up by a prime mover. In this case, the A.C. power requirement at 200 c.p.s. is always low. Conveniently, an auxiliary generator for the 200 c.p.s A.C. supply is also driven by the prime mover. The auxiliary 200 c.p.s. generator must then be run up to speed before the main 50 c.p.s. generator is energised.

A double-speed synchronous motor, having the second harmonic damping and starting fields of the embodiments so far described herein, is conveniently designed as a 2-pole main field 4-pole damping field machine to run at 6,000 r.p.m. or as a 6-pole main field, 12-pole damping field machine to run at 2,000 r.p.m., since these two speeds are not otherwise directly obtainable.

As a synchronous generator, such a machine is conveniently designed as a 2-pole main field, 4-pole damping field machine to be drive at 6,000 r.p.m. and generate a supply at 50 c.p.s. The auxiliary generator is then a 4-pole machine of conventional design.

A particularly attractive embodiment of the invention for use, as a motor or as a generator, with a 3-phase A.C. supply is a machine in which the superimposed damping field and auxiliary starting field is the third harmonic of the main field; and thus it has three times the number of poles instead of twice the number of poles as have the embodiments so far described.

One form of such a machine has a 2-pole main field, a 6-pole damping and starting field and runs at the double, 50 c.p.s., synchronous speed of 6,000 r.p.m.

Figure 8:
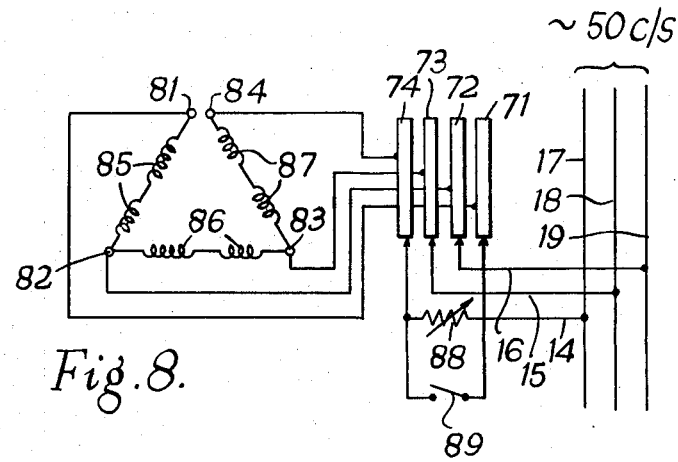
FIG. 8 is a circuit diagram of rotor windings for a machine having a 2-pole main field and a 6-pole superimposed damping field.
Figure 10:
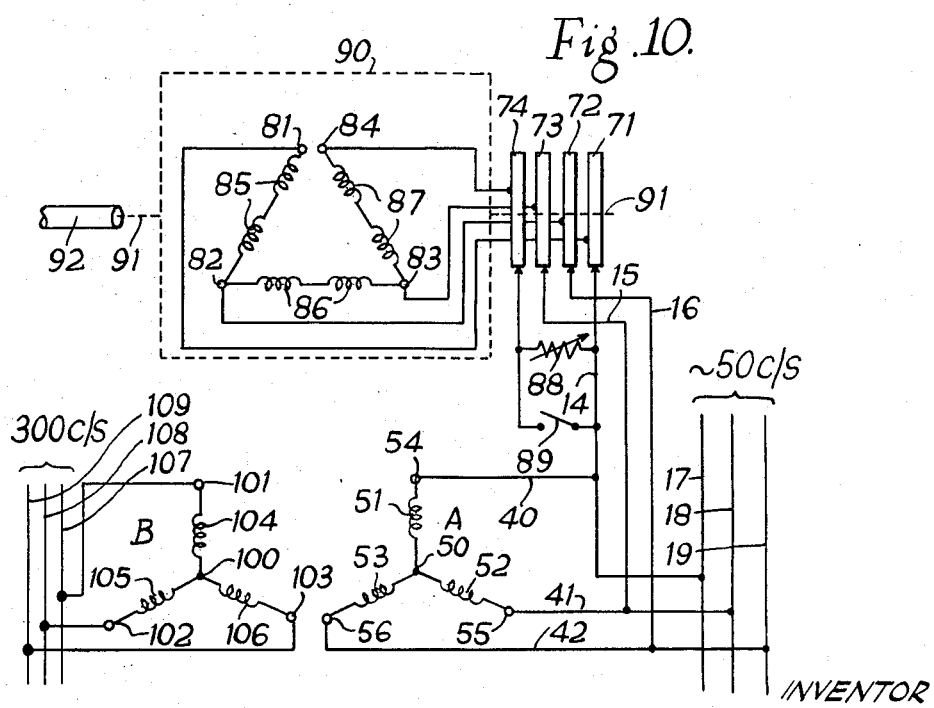
FIG. 10 is a circuit diagram of a 2-pole/6-pole machine according to FIGS. 8 and 9.

A particular embodiment has 2-pole/6-pole rotor windings as shown in FIG. 8 and separate main field and damping field stator windings "A" and "B," as shown in FIG. 4, except in that the higher frequency A.C. supply is of 300 c.p.s. instead of 200 c.p.s as shown therein. The stator windings are further shown in FIG. 9 and the complete machine is also shown in FIG. 10.

The rotor winding of FIG. 8 is a full-pitch 2-pole winding comprising phase-windings 85, 86 and 87 series-connected between terminals 81, 82, 83 and 84, as illustrated. The terminals 81, 82, 83 and 84 are respectively connected to slip-rings 71, 72, 73 and 74. Slip-rings 71, 72 and 73 are respectively connected by brush leads 14, 15 and 16 to a 50 c.p.s., 3-phase A.C. supply on lines 17, 18 and 19.

The slip-ring 74 is connected by its brush lead and by way of a variable resistor 88 to the brush lead 14 of slip-ring 71 and also to one side of a switch 89 which, when closed, shorts together terminals 81 and 84 by way of slip-rings 71 and 74.

The rotor winding of FIG. 8 serves as a 2-pole delta-connected, 3-phase winding and also as a 6-pole, series-connected, single phase winding.

As a motor, this machine is started in exactly similar manner to that described for the second harmonic damping embodiments. The switch 89 is open and the resistor 88 therefore in circuit for starting. Inclusion of the resistor 89 gives improved starting torque.

An induction motor having a 3-phase stator and single phase rotor may exhibit Görge's phenomenon and run at half speed. This effect may be avoided, as in the present case, by inclusion of series resistance in the rotor circuit.

The rotor runs up to speed, to nearly double the 50 c.p.s. synchronous speed, due to the rotating starting field produced by the starting, and damping, field stator winding "B" energised at 300 c.p.s. Switch 89 is closed to connect the phase-windings 85, 86 and 87 in delta to the 50 c.p.s., A.C. supply. Both rotor windings and stator windings "A" are then energised at 50 c.p.s.

When running at the double synchronous speed of 6,000 r.p.m., the rotor winding appears, in relation to currents induced by the stator fields as an open-circuited winding to the 2-pole field and as a short-circuited winding to the 6-pole field.

The circuit arrangement of the stator windings will be described with reference to FIG. 10.

In FIG. 10, the main field 2-pole windings "A" comprises three star-connected phase-windings 51, 52 and 53 connected respectively between the star centre 50 and terminals 54, 55 and 56. Terminals 54, 55 and 56 are supplied with 50 c.p.s. A.C. from lines 40, 41 and 42 respectively, these lines being appropriately connected to the 50 c.p.s. 3-phase, A.C. supply on lines 17, 18 and 19 to give oppositely-rotating rotor and stator 2-pole fields.

The damping and starting 6-pole winding "B" comprises three star-connected phase-windings 104, 105 and 106 connected respectively between the star centre 100 and terminals 101, 102 and 103. Terminals 101, 102 and 103 are supplied with 300 c.p.s. A.C. from lines 107, 108 and 109.

Figure 9:
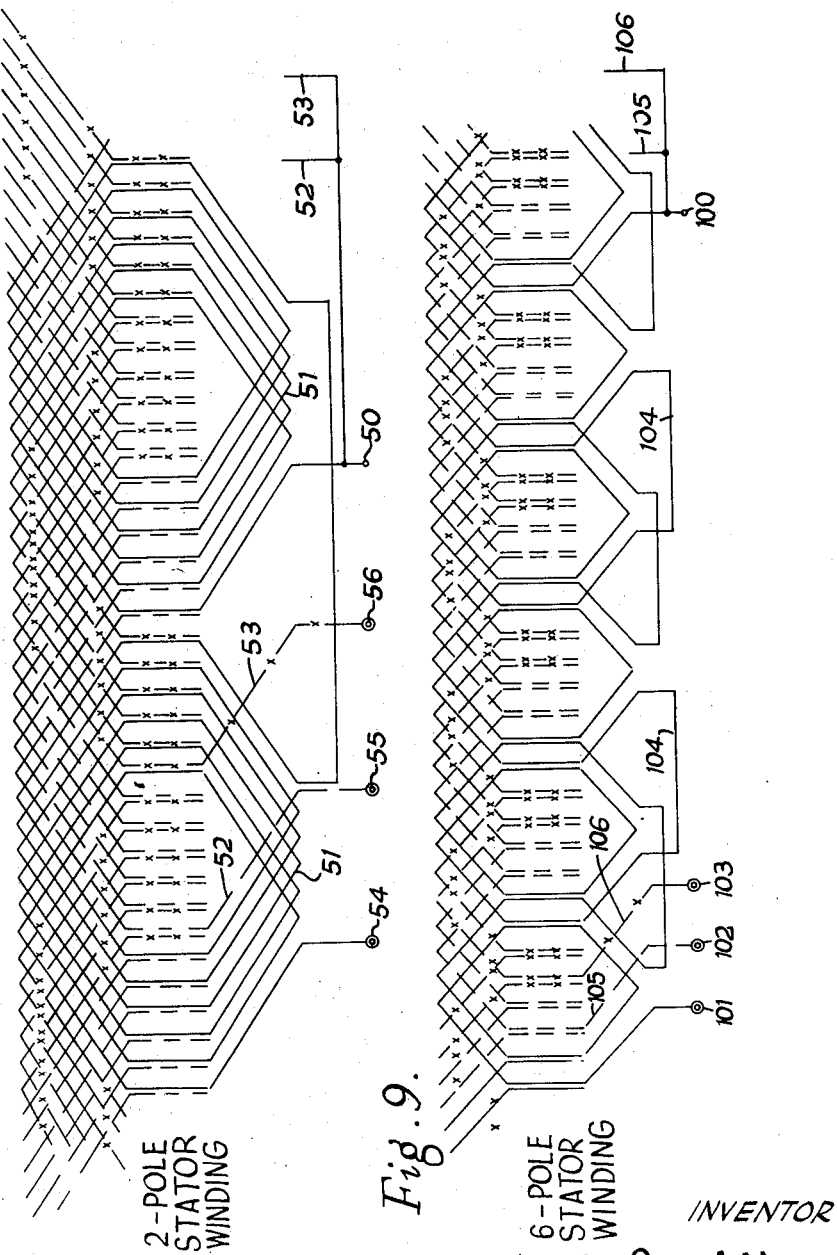
FIG. 9 is a slot winding diagram of corresponding stator windings to provide a 2-pole field and a 6-pole field.

The arrangement of the windings "A" and "B" on the stator of the machine is shown in the slot winding diagram of FIG. 9, in which the references for the windings and terminals are the same as in FIG. 10.

The 2-pole winding 51 has a coil pitch from slot 1 to slot 13 and so on, that is ⅔ of full pitch (2-pole), and six coils per group. The other phase-windings 52 and 53 are similarly wound.

The 6-pole winding 104 has a coil pitch from slot 1 to slot 7 and so on, that is full pitch (6-pole), and two coils per group. The other phase-windings 105 and 106 are similarly wound.

The two windings "A" and "B" are superimposed in the same stator slots, as shown in FIG. 9. The 6-pole winding "B" is arranged nearer to the mouth of the slots.

The machine of FIG. 10 is reversible, in relation to 50 c.p.s. A.C. power supply, to operate either as a motor or as a generator. The rotor is indicated by the broken line box 90 and the rotor axis by the broken line 91. The line 91 is shown forming the axis of the slip-rings 71, 72, 73 and 74 and of a rotor shaft 92. The rotor shaft 92 is driven by the rotor to drive a load or is driven by a prime mover to drive the rotor accordingly as the machine is operated as a motor or as a generator.

In the latter case the stator winding "B" is conveniently energised from a 300 c.p.s. A.C. generator driven by the same prime mover. Both the rotor windings and the stator winding "A" feed power into the 50 c.p.s. A.C. mains by lines 17, 18 and 19.

The attractiveness of this third harmonic damping machine for use with a 3-phase supply arises from the fact that delta-connected, tertiary, windings are well-known to damp out the third harmonic of the main field flux. Therefore, when the machine is running at full, double synchronous speed, a low-power 300 c.p.s. A.C. supply to provide a weak 6-pole field is adequate to provide good rotor damping.

Moreover, a disadvantage which would exist with a 2-pole/4-pole second-harmonic damping machine is avoided in a third harmonic damping machine.

Such a 2-pole/4-pole motor would have a rotating field unbalance which, although not such as to prohibit its practical use, would necessitate care in design. This effect arises from the known fact that whenever in a machine two rotating fields are superimposed, having pole-numbers differing by two, a rotating unbalanced magnetic field results.

For example, if the two fields superimposed are 2-pole and 4-pole, rotating respectively at 3,000 r.p.m. and 6,000 r.p.m. the unbalanced magnetic field rotates at 9,000 r.p.m.

In the embodiment described, using 2-pole and 6-pole fields, the unbalance does not exist.

I claim:

1. A rotary electric machine having stator and coil wound rotor windings, the stator winding being constructed to provide a main field of $p$ poles to be energised at a frequency $f$ per second and to further provide a superimposed rotating field of $np$ poles to be energised at a frequency $2nf$, where $n$ is a small integer, said rotor winding coils when energised solely by induced currents operating as at least one short circuited winding in relation to the energised superimposed field of $np$ poles and said rotor winding coils when energised additionally from excitation current supply means operating as an open circuited winding in relation to the energised main field of $p$ poles.

2. A rotary electric machine according to claim 1, in which the stator winding comprises a first and a second winding part, the first part being wound to provide the main field of $p$ poles and to be energised at frequency $f$, and the second part being wound to provide the superimposed rotating field of $np$ poles and to be energised at frequency $2nf$.

3. A rotary electric machine according to claim 1, in which the stator winding has the coils thereof series-connected and provided with a centre-tap, said series-connected coils being energised at frequency $f$ between the outer ends of the series connection and energised at frequency $2nf$ between the centre tap and both the outer ends of the series connection.

4. A rotary electric machine according to claim 1, for 3-phase operation, having said coil wound rotor winding comprising three phase-windings, each phase-winding having the coils thereof, when energised solely by induced currents operating as a short circuited winding in relation to the energised superimposed field of $np$ poles, 5. A rotary electric machine according to claim 4, having the stator winding constructed to provide an energised superimposed field of $3p$ poles and to be energised at frequency $6f$.

6. A rotary electric machine according to claim 1, for operation as a 3-phase synchronous motor at the double-synchronous speed of $4f/p$ revolutions per second, having a 3-phase stator winding constructed to provide said energised main and superimposed fields, and having a 3-phase rotor winding with the coils of each phase thereof when energised solely by induced currents operating as a short circuited winding in relation to the energised superimposed field and said rotor winding coils when energised additionally from excitation current supply means operating as an open circuited winding in relation to the energised main field.

References Cited in the file of this patent
UNITED STATES PATENTS

| | | |
|---|---|---|
| 1,781,538 | Creedy | Nov. 11, 1930 |
| 2,084,178 | Angst | June 15, 1937 |
| 2,795,750 | Johnson | June 11, 1957 |